Feb. 25, 1947.  S. C. LEHMAN  2,416,332
CONTAINER FOR DISTRIBUTION OF FOOD AND OTHER PRODUCTS
Filed April 24, 1943  5 Sheets-Sheet 1
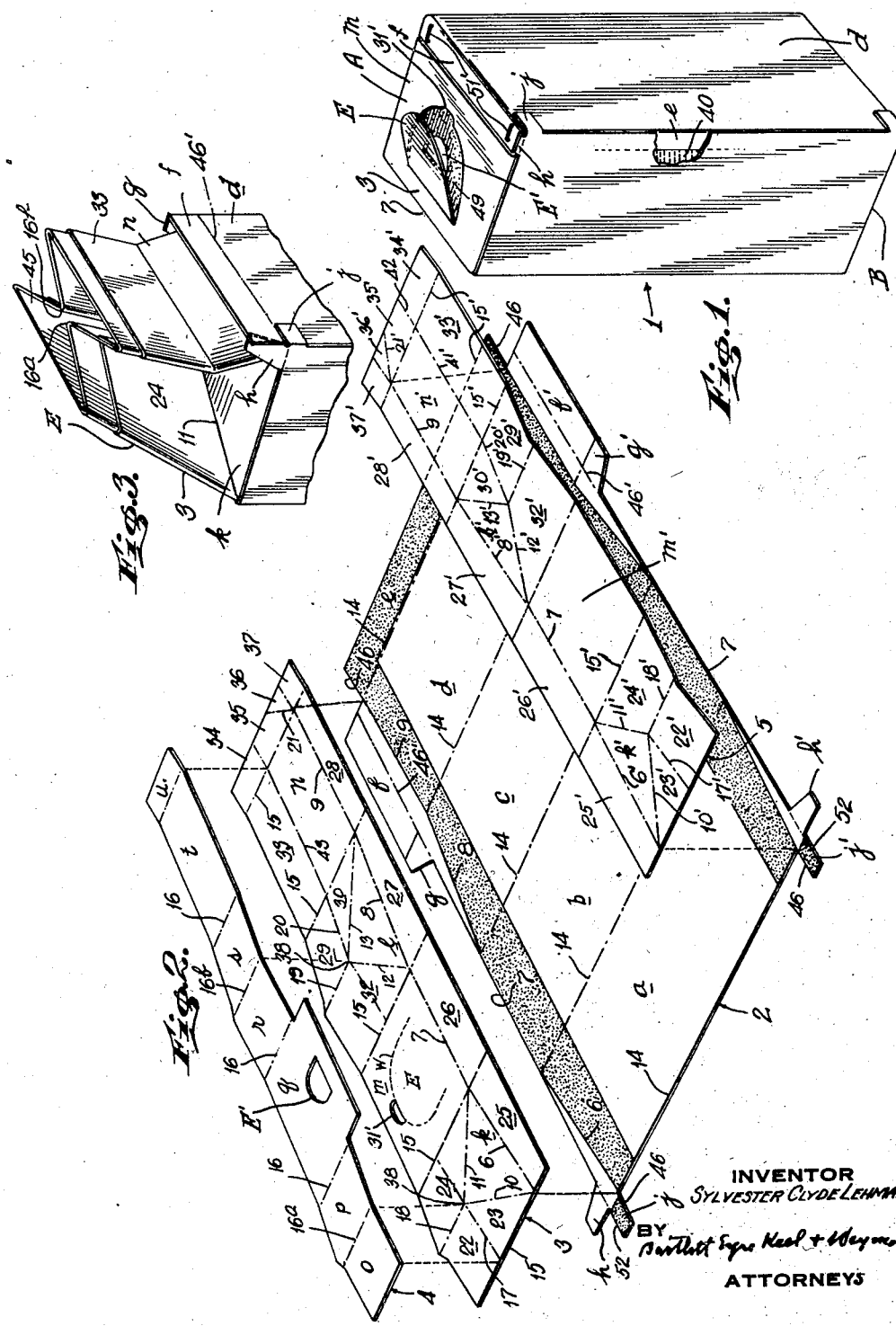
INVENTOR
SYLVESTER CLYDE LEHMAN
BY
ATTORNEYS

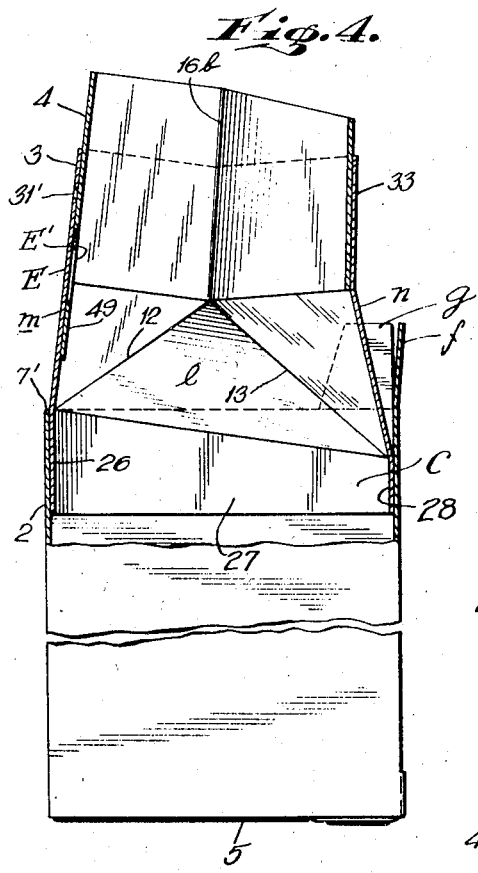
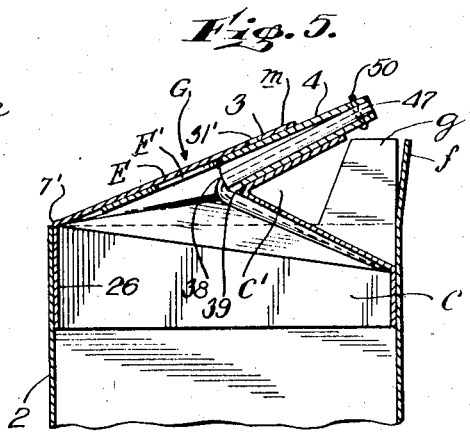
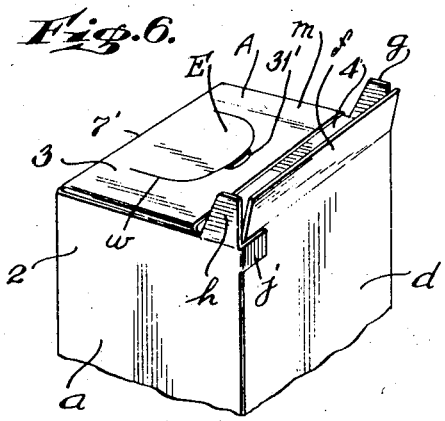
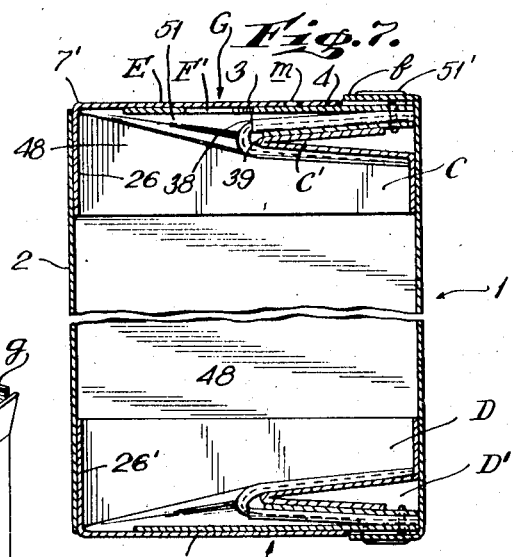
INVENTOR
SYLVESTER CLYDE LEHMAN
BY
ATTORNEYS

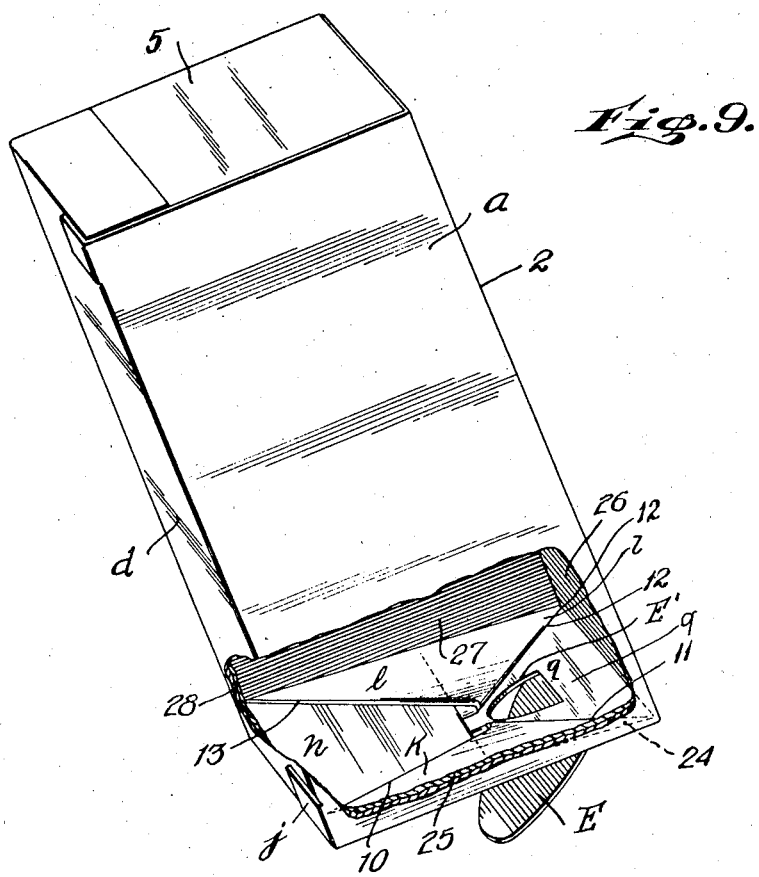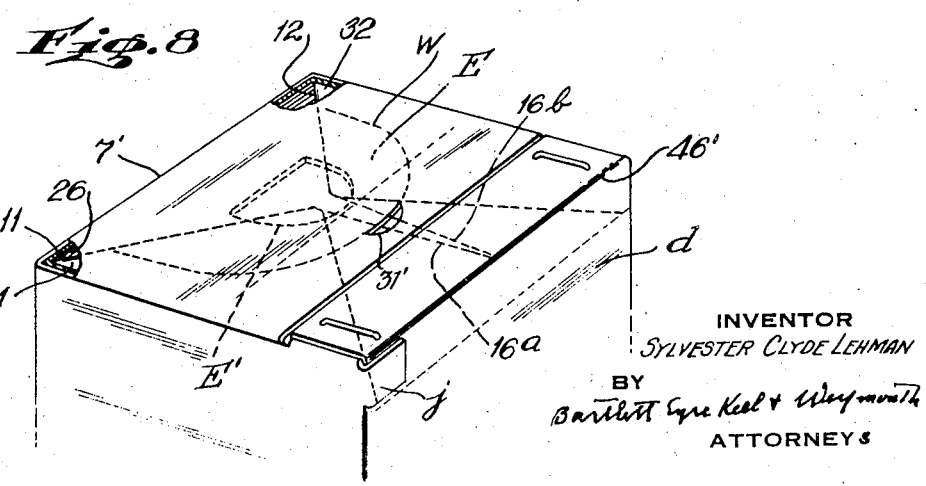

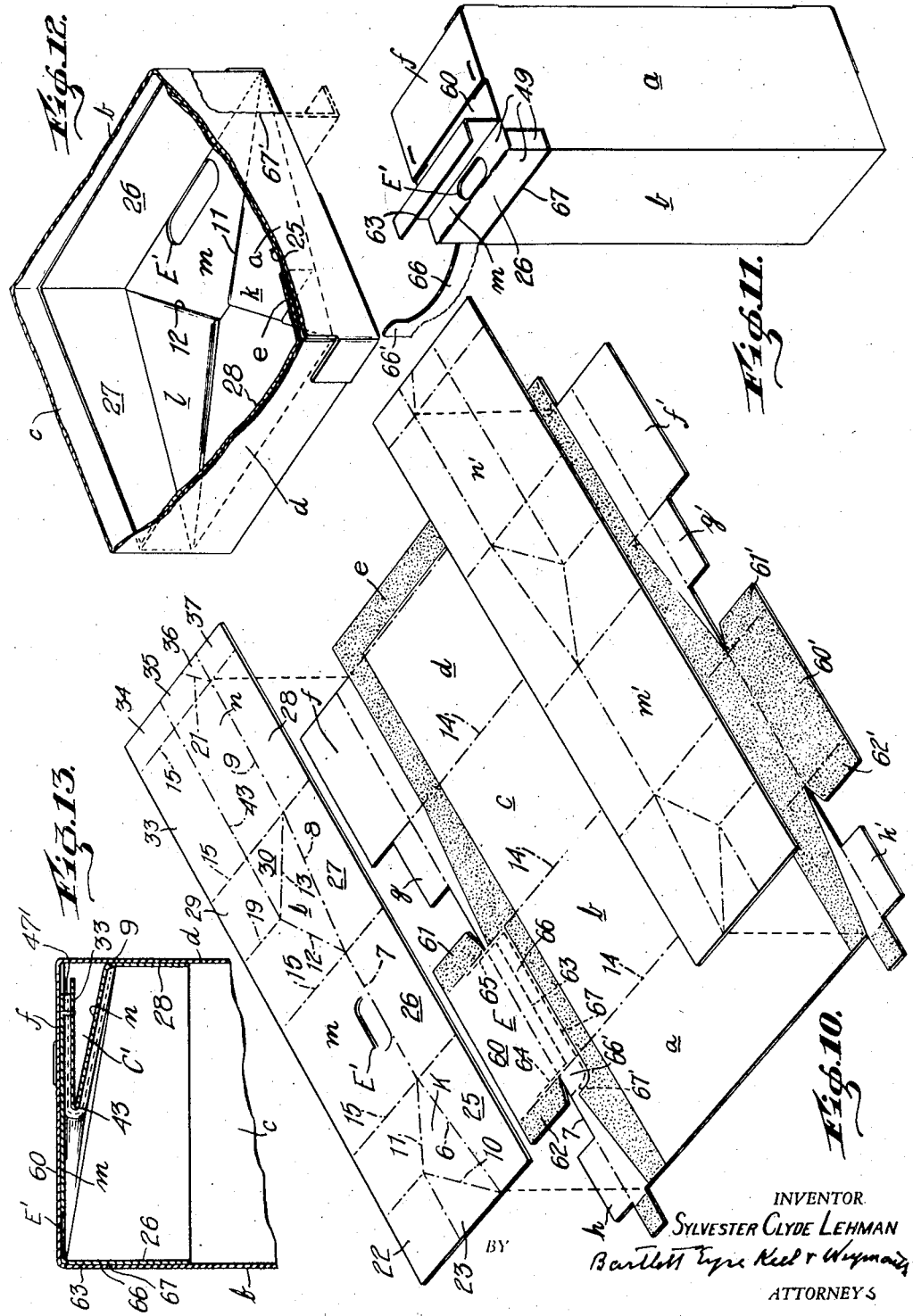

Feb. 25, 1947. S. C. LEHMAN 2,416,332
CONTAINER FOR DISTRIBUTION OF FOOD AND OTHER PRODUCTS
Filed April 24, 1943 5 Sheets-Sheet 5
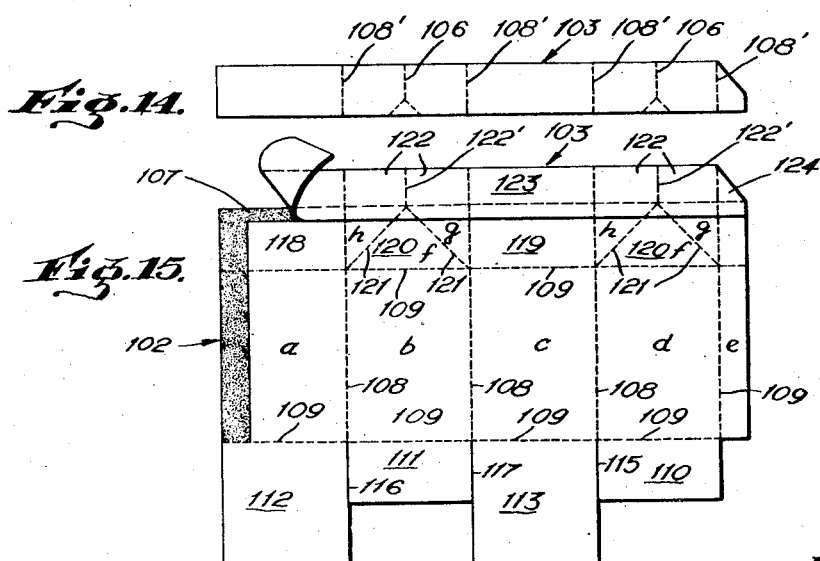
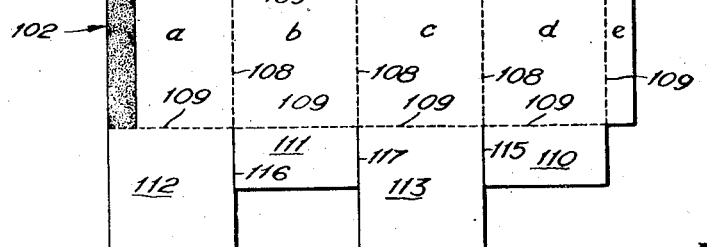
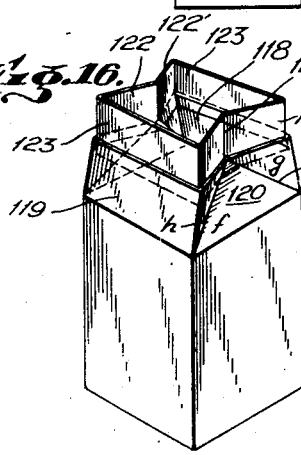
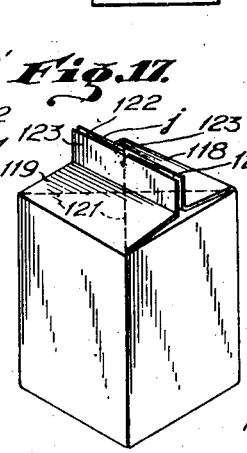
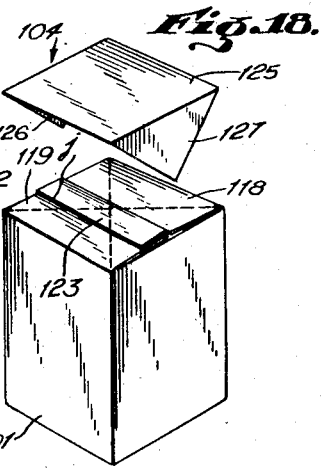
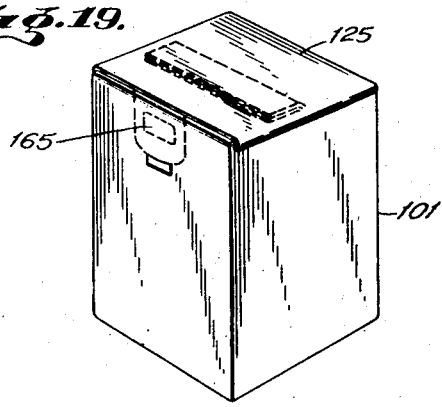
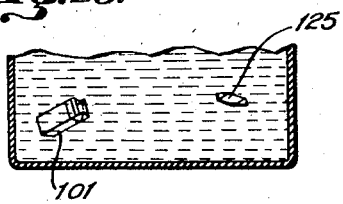
INVENTOR
SYLVESTER CLYDE LEHMAN
BY
ATTORNEYS Patented Feb. 25, 1947

2,416,332

UNITED STATES PATENT OFFICE 2,416,332

CONTAINER FOR DISTRIBUTION OF FOOD AND OTHER PRODUCTS

Sylvester Clyde Lehman, Jersey City, N. J.

Application April 24, 1943, Serial No. 484,342

11 Claims. (Cl. 229—37)

This invention relates to containers for food products and particularly to containers formed of fiber or the like for use in packaging liquid food products, with or without carbonation, although the invention is suitable for use in packaging solid materials.

One object of the invention is a novel and improved container which is characterized by the provision of a durable and tight seal, by the facility with which it may be stacked for storage and shipping in large quantities in unassembled tubular flat blank form and then easily assembled, being further characterized after assembly by the facility with which it may be stacked for storage and shipping in large quantities. A further object of the invention is a container of the above indicated character which is characterized by its having a uniform flap and pleasing appearance.

A further object of the invention is a container or package of the above indicated character having a box-like exterior with flat top and bottom for facilitating the handling, transportation and marketing of the package.

A further object of the invention is a container which is characterized by its ability to withstand internal pressure and rough usage and its resistance to shocks encountered in the handling and shipping of the filled containers.

Another object of the invention is a container for the purpose indicated which is characterized by the provision of cushioning chambers at the top and bottom which function to cushion outside shocks and disturbing blows against impairment or upsetting of the seal.

A further object of the invention is a container of the above indicated character having a novel reinforced structure at the top and bottom thereof.

A further object of the invention is a novel and improved container of the character indicated having a flat bottom and top for facilitating the stacking thereof and having a tearable opening formed on the upper end wall or top of the container.

A further object of the invention is a container of the above indicated character which may be economically assembled upon a quantity production basis in inexpensive automatic machinery and without the necessity for the use of a container tube mandrel and without requiring any score line redefining operations after forming or squaring.

To the above ends it is an object of the invention to provide a novel and improved strong fiber container protected against leakage and characterized by the facility with which it may be assembled enclosed in a form having a flat box-like exterior throughout, and further characterized by the reinforcing and shock absorbing and resisting structure at the top and bottom.

Further objects of the invention will hereinafter appear.

For a better understanding of the invention reference may be had to the accompanying drawings forming a part of this application wherein—

Fig. 1 shows a filled and sealed container embodying the invention with dispensing device opened for pouring;

Fig. 2 is a perspective view showing the formation of the integral blank out of which the container is formed;

Fig. 3 is a perspective view of the container partly broken away ready for filling and sealing;

Fig. 4 is a sectional view in part similar to Fig. 3;

Fig. 5 is a sectional view of the upper end of the container in process of being sealed after filling;

Fig. 6 shows a further step in the sealing operation;

Fig. 7 shows the sealed filled container with the reinforced ends and the cushioned chambers;

Fig. 8 is a perspective view of the container with certain parts broken away;

Fig. 9 is a perspective view of the container illustrating the pouring operation;

Fig. 10 is a perspective view of blanks for a modified container;

Fig. 11 is a perspective view of the finished container;

Fig. 12 is a perspective view of the container upside-down for pouring with parts broken away;

Fig. 13 is a sectional view through the top of the container according to the modification of Figs. 10, 11 and 12;

Figs. 14 and 15 illustrate blanks for use in forming a modified container embodying the invention;

Figs. 16, 17 and 18 illustrate stages in the manufacture of the modified carton or container;

Fig. 19 is a perspective view of a completed container embodying the modifications of Figs. 14 to 18; and Fig. 20 illustrates the saturation steps of such container.

Referring to Figs. 1 and 7 of the drawings I have shown my invention as embodied in an elongated four cornered container 1 of square cross section, having a flat top A and a flat bottom B.

It is provided with a special continuous reinforced top C and a similar reinforced bottom D, and it is further characterized by a shock absorbing and resisting closure G at the top and a similar closure H at the bottom.

It is further provided with an easily openable closure E which may be torn and pulled away from the pouring opening E' formed in the top closure.

The container thus constructed may be filled to the top, while the reinforced ends of the container and the shock absorbing closures G and H with the accompanying air cushioning chambers C' and D' at the top and bottom enable the containers to withstand the rough usage to which they are subjected in handling and shipping. As many as may be desired may be stacked one upon the other without injury or impairment of the seals. The full filling feature and the openable opening on the top are obtained with their full advantages along with the reinforced structures and shock resisting closures. Thus the reinforced top and bottom structures, and the shock absorbing and resisting closures both at the top and bottom form important features of this container, and a further important feature, among others, is the correlation into this reinforced and shock absorbing and resisting structure, of the flat top and flat bottom easily stackable feature, and the easily openable opening formed in the top wall.

In the particular embodiment of this invention which is illustrated in this application the container is formed of a single composite blank which in turn is formed of three separate strips or blanks 2, 3 and 5, which are glued or otherwise fastened together to form a composite blank, and a fourth part 4 is shown for forming a pouring opening in the top wall. For convenience in illustration these four blanks or strips are separately illustrated in Fig. 2, but it is understood that they are assembled together and fastened and sealed together in the relative positions indicated. These blanks are indicated as creased or crimped along the lines indicated by dot and dash and preferably these blanks are creased or crimped separately before they are assembled and glued together, but it may be in certain cases advantageous to crease or crimp these blanks after they have been assembled and fastened together into a composite blank. Preferably also each blank is cut, stamped and trimmed into the desired form before the assembly into the composite blank, but it may be advantageous in certain instances to effect a part of this trimming and stamping operation after the assembly into the composite blank.

The blank 2 forms the main body walls of the container as indicated by panels a, b, c and d, while a flap e is formed on the edge of the panel d for securing the edges of the panels d and a together when the blank is formed into the container. The flap e is secured, as by gluing, to the inner side of the edge of the panel a, and the latter is provided with ears or flaps f, both at the top and the bottom which fold about the panel a and are secured to the outer surface thereof, as by gluing. This blank 2 may advantageously be made of dense rigid fiber board material of the required strength and rigidity when reinforced at the top and bottom as will now be described to withstand the rough usage encountered in handling and shipping the food product contained therein.

The blanks 3 and 4 function to reinforce the top of the container and provide for the shock absorbing and resistant closure for the top, and to provide for the readily openable pouring opening in the end wall of the container for dispensing a liquid product. These may be of the same material used to fabricate the main body blank 2, or if desired, a different material or a material of a different rigidity may be employed.

The blank 3 is glued or otherwise fastened and sealed to the blank 2, and to the inner surface thereof, the sealing surface of the blank 3 being that indicated by the numerals 25, 26, 27 and 28. These parts which are glued to the inner surface of blank 2 are defined by the crimping lines 6, 7, 8 and 9; and when the blank 3 is glued or sealed to the blank 2 these crimped lines 6, 7, 8 and 9 are coincident with the line 6, the edge 7 of the panel b, the line 8, and the line 9 respectively of the panels a, b, c and d. The part 37 is also sealed or glued to the inner surface of the upper end of the flap e. With the panels 2 and 3 thus glued together, the crimp lines 14 of blank 2 and crimp lines 15 of blank 3 form continuations of each other. The part of the panel above the sections 25, 26, 27, 28 and 37 forms the closure for the end of the container and this part is crimped or creased along the lines indicated to form various sections or panels.

Panels k, l, m and n form end closing walls which are more or less exposed to the contents of the container. k and l are triangular panels formed respectively along the inclined crimped lines 6 and 8, the former being further defined by the crimped lines 10 and 11 and the latter being further defined by the converging lines 12 and 13. The apex of the triangular panel k is approximately midway between the adjacent line 15 and the left end of the blank, the line 17 being approximately equal in distance to the shortest distance between the apex of the triangle and line 15. The shortest distance between the apex of the blank k and the line 6 is also approximately the length of the line 17 though it may be slightly greater or less. The triangular panel l is similar to the panel k, being defined by the creased lines 12 and 13 and the apex of this panel is substantially equally distanced between the two crease lines 15. The panel m joins the side wall b at its crimped border line 7.

The panel m may be termed a lever means or closure panel. It is disposed in a position to function as a stacking support lever end, and it contains a semi-circular easily tearable opening panel E, the latter being scored along the arc w to enable panel E to be torn away from the panel along the line w and lifted so as to open the pouring opening to be described below. A slot or other recess 31' is formed in the panel m to accommodate the fingernail in engaging and then easily tearing the panel E along the line w by use alone of the thumb and finger.

This intermediate panel m of the blank 3 is provided with a layer q which is glued or otherwise fastened to the inner surface thereof to form a composite whole. This layer q is provided with an opening E' cut out therein which functions as a dispensing opening when the registering tearable part E is lifted to open the container. This layer or panel q may be sealed or glued to the panel m in any suitable manner. In the particular embodiment shown, this auxiliary panel q forms part of an elongated blank 4, and the whole blank except panel q is glued or otherwise sealed to the outer edge of the blank 3. This blank 4 is crimped along the lines 16 which form continuations of the lines 14 and 15 in the composite blank. The crease lines 16a and 16b are coincident with the crimp lines 18 and 19 respectively of the blank 3 when assembled in the composite blank. The panel or division o of the blank 4 is thus glued to the panel 22 of panel 3, the panel p to part 24, the panel r over a part of panel 32, the panel s over the panel 29, the panel t over the panel 33 and the panel u over the panel 34. Also the parts of the blank 4 in the particular embodiment illustrated extend out beyond the edge of the blank 3 at the parts o, p, r, s, t and u, thus forming a slight extension thereof.

The bottom reinforcing and closure means or blank 5 is similar to the blank 3 except that the dispensing opening is dispensed with and accordingly the panel q is omitted together with its carrying blank 4. Similar and corresponding parts of the blank 5 bear the same designating numerals applied to the blank 3, with primes to distinguish these parts from the parts of blank 3. The width of the blank 5 is made substantially the width of the composite blank 3 and 4.

The panels u, 35, 36, 37 are sealed to the inside edges of the panels o, 23, k, 25, respectively, at the same time of sealing flap e to an inside edge of panel a; or where the blank 4 is dispensed with as at the bottom the panels 34', 35', 36', 37' are sealed to the inside edges of the panels 22', 23', k', 25' respectively. In this form the assembled blanks 2, 3, 4, 5 form an integral square tubular structure throughout, requiring no further additions to assemble completely, except for leak-proofing or pressure-proofing and stapling, which structure may, if desired, be pressed flat with the inner surfaces of panels a, b, pressed adjacent each other and likewise the panels c, d, pressed adjacent each other, whereby a considerable number of these flat tubular-shaped blanks may be stacked and packed together in a small space for shipping.

The container ready for filling is illustrated in Fig. 3, i. e., a composite blank has been folded about itself to form a square four cornered container with the flap e sealed to an inside edge of the panel a and the ears or lugs j of the panel a folded about the panel d and glued to the outer surface thereof. When the container is full the closure is effected by stapling the outer end together by means of the staple 50 as indicated in Fig. 5. The thus stapled end is then pressed down with triangular parts k and l brought down to positions more nearly in the plane determined by the inclined lines 6 and 8 of the opposite panels, while panel t, 33 is folded over toward the panel n about the line 43. The outer panel m is brought down to occupy a plane at right angles to and coincident with the end edges of the container, whereupon the ears or lugs h and g are folded over across and against the outer edge of the end closure and the closing flap f is then brought over into engagement with the end closure and in overlapping relation with the ears or lugs h and g and stapled to the latter. This latter operation is a simple one, since any flat instrument for sequentially forming and clincking the approaching legs of the staple whereby to securely seal the rib may be disposed underneath the lugs h and g while the stapling operation is taking place and then withdrawn. Likewise the bottom closure is effected in the same manner as described with respect to the top closure.

The closures at the ends of the container are thus formed of an accordion-like means with air spaces 51 between the outer closing panels 24, 32 and the triangular panels k and l, respectively, and air space C' between the panels 33 and n whereby any undue pressure or shocks delivered to the ends of the container are absorbed by the yielding of this closure means, rendered possible by this accordion-like air cushioning construction. This is effected especially through the provision of the wedge shaped space C' between the plane of the inclined edges 6 and 8 and the plane of the upper end of the container, within which wedge shaped space is contained the accordion-like closing means, which gives and yields in response to blows and pressure received from without. These closures as pointed out above also form a reinforcing means for the ends of the container, the main body of which may be formed of a lighter weight and less rigid material than would otherwise be the case.

The dimensions of this wedge shaped closing space C' or the degree of incline of the lines of the edges 6 and 8 may vary within limits determined by actual conditions, as for example being variable dependent upon the thickness and the rigidity of the material used to fabricate the blank 3. A more pliable material will require a less degree of incline, but the incline should be sufficient in any case to provide a clearance in the cushioning compartment for the filling end closure including a small space between the folded portions of the closure extension, said compartment being formed by the panels a, c, d above the lines 6, 8 and 9. The parts 25, 26, 27 and 28 of the panel 3 function, as indicated, as reinforcing panels at or near the end of the main side wall panels a, b, c and d respectively, and similarly with respect to the reinforcement at the bottom of the container. Where the blanks 2 and 3 are made of material having similar strength and rigidity, the side wall panels a, b, c and d form two-ply portions at the end, and will thus have at least double strength and will stand considerable greater shock or strain than a single ply panel. By means of this two-ply structure at the bottom and top of the container, the liquid holding compartment 48 is reinforced so as to ensure the same against leakage to a far greater degree than heretofore has been practicable for filled closures in single blank containers of the four or more ply transverse rib type.

The closures formed of blanks 3, 4 and 5 reinforce or protect the main body walls of the container both vertically and horizontally; the panels 26 of blank 3 and 26' of blank 5 vertically reinforce the upper and lower ends of panel b of blank 2, respectively. The panels m, 23, 24, 32, 29, 33, 34 of blank 3 and panels q, o, p, r, s, t, u, of blank 4, in the region forming the rib seal are compacted and disposed in a position to function as a shock-absorbing member to the liquid-holding compartment 48 at one end, due to the outwardly pressing tension of the rib seal 47 against the support flaps f, g and h, and a small cushioning space C' between the panels n and 33 forming an end portion of the liquid-holding compartment. Thus the small clearance C' between panels n and 33 allows the support f to be crushed upon subjection to shock or strain and further to allow the rib seal 47 to be bent inwardly against the top of the liquid-holding compartment whereby to vertically reciprocate upon a pivot 7' and function as a side-end, spring-arm cushioning member against shock or strain. To facilitate fabrication and assembling the reinforcing panels 25, 26, 27, 28 and the shock-cushioning rib-seal member together with the potential cushioning properties stored within the folds 10, 11, 17, 12, 13, 20 cooperating with the triangular closure panels k, l, 23, 30, the blank 3 is advantageously fabricated from a one-piece strip of continuously fibrous rigid board material having an elasticity of considerable magnitude whereby the folded portions adjacent the liquid-holding compartment 48 will provide cushioning properties of a high degree. By filling the container to full capacity, then sealing the rib closure by stapling, and then assembling the free end of the rib beneath the stacking support f, the liquid contents 40 (Fig. 1) will act as an auxiliary to prevent undue warping or rupture of the liquid-holding compartment wall upon subjecting the closure to shock or strain, since the walls of the liquid-holding compartment will resist any tendency toward transformation of the wall structure into such as would lower the capacity of this compartment.

The lever means or panel m hingedly bent upon crimped line 7' against the compressive tension of the folded inner portions through lines 12, 13, 20, 43, 10, 11, 17, after sealing of the rib by stitching or stapling, cause the panel m to provide an effective leverage against a fulcrum of a rib-base 39 and point of location 38 upon the folded portions under tension and thereby insure against spreading of the rib at the base 39 and as a result prohibit any tendency of the rib closure portions to separate such as to cause separation of, or spreading-strain upon, the connected parts of the secured seal. Thus the panels m and 33 are compelled to collapse including also panels 23, 24, 32 and 29, especially when panel m is bent inwardly against a completely filled or pressure-filled liquid-holding compartment 48.

The rib seal 47 formed by the panels o, p, q, r, s, t, u of blank 4 provides a continuous transverse four-ply structure, since the folded portions 16a and 16b meet in a manner such as to provide a continuous transverse seal.

The rib seal formed by the panels 22', 24' and 39', 32', 29', 33', 34' of blank 5 provides a continuous transverse four-ply structure, since the folded portions 18', 19' meet in a manner such as to provide a continuous transverse seal.

In the preparation of the containers for filling, the container as illustrated in Fig. 3 is preferably dipped in paraffin and then cooled. The end flaps or closures are preferably again dipped in or treated with a wax (see 45) which is stronger than ordinary paraffin. The end flaps or closures are dipped in heated stearic acid after this treatment and allowed to cool to strengthen the seal. This is due to the fact that this coating of wax 45 is stronger than paraffin at usual atmospheric temperatures.

The staple 50 may consist of a multiple number of stitches, i. e., a multiple number, say four, staples may be used so as to cause a more uniform and stronger stitched seal of the four-ply rib seal 47.

The panels 36 of blank 3 and 36' of blank 5 are preferably fabricated in a manner whereby to provide maximum pliability. This may be accomplished between dies so as to cause successive crimping operations over the entire area of panels 36, 36' until the stiff fibrous structure of the fiber board is broken down and made very pliable. This pliable area may if desired extend a short distance into panels 37, 35, 37', 35'.

The perforated tearable-out portion E forming a dispensing device in the stacking support panel m, upon lifting of the flap E from the pouring openings E' is horizontally located at the uppermost portion of the liquid-holding or pressure-holding compartment 48 so that the container may be opened without serious loss of any contents 40 while resting upon a level base, even when the container is completely filled with a product and then sealed. This form of dispensing device is not resealable whereby to provide a single-service container 1 wherein the bottler may protect his container, once filled, and sealed, from being refilled and sold including within a competitive inferior product. The dispensing device including the perforated portion w and portions E, E' are protected from rupture or leakage upon subjecting the end closure of inner and outer means to shock or strain due to the reinforced end structure formed by the closure panel 26, the seal-locking support f, and the outwardly pressing tension of the inner closure means formed by the fibrous folded panels k, l, n, 22, 23, 24, 29, 30, 32, 33, 34, 35, 36, o, p, r, s, t, u, against the outer closure means formed by the panels m and q including the perforated portion w and slot 31' in panel m. The top closure panels formed of the glued-together fiber blanks 3 and 4 are provided with a rectangular extension panel of blank 3 forming on one side of the completely filled container a rectangular major end reinforcement 26 in the container and further extensions of blank 3 including a smaller rectangular panel 28 forming on the opposite side of the container a liquid-holding compartment end reinforcement, and other extensions of blank 3 including trapezoidal panels 25, 27 forming between these container sides two liquid-holding compartment end reinforcements opposite each other, and further extensions of blank 3 including panels k, 23, 24, l, 32, 33, 30 and n forming outwardly pressing tension of the more or less compacted fibrous folds of the liquid-holding compartment against the panel m and the dispensing device E, E', w, whereby to reinforce the dispensing device against rupture, leakage, or undue displacement during shock or strain. The folded closures comprising panels k, l, m, n, 22, 23, 24, 29, 30, 32, 33, 34, 35 and 36 of blank 3 and the panels k', l', m', n', 22', 23', 24', 29', 30', 32', 33', 34', 35' and 36' of blank 5 including the panels o, p, q, r, s, t, and u of blank 4, when the container 1 is completely filled with a liquid product 40 under pressure such as, for example, carbonated beverages, is capable of simultaneously functioning both as outwardly expandable pressure-holding walls to a small degree and as cooperating parts providing free-end-yieldable shock-cushioning seal members 47 for the container, the free-end-yieldable portions also being capable of acting as seal cushioning members at the same time, as for example during a period when the container ends are subjected to sudden shock. In the latter case, when the container is filled and sealed with a product under pressure, the clearance C' is preferably restricted to much less dimensions vertically than as illustrated in the drawings while still retaining a satisfactory measure of the desired characteristics already referred to in the invention. The panel q of blank 4 is glued to the panel m of blank 3 in a manner whereby the external border area of panel m surrounding the perforated line or easily tearable portion w is bonded securely with a strong adhesive such as glue, and the tearable portion E, capable of providing a liftable flap upon tearing upon the line w, is weakly bonded to the panel q with a weak adhesive area 49 such as by use of stearic acid or paraffin. Weak bonding may be easily accomplished by paraffining the squared container prior to folding of the closures in a manner say by dipping the entire container in paraffin. Advantageously, the opening E' is of smaller area than the tearable portion E whereby to provide a waxed border 49 of sufficient width whereby upon weakly bonding the portion E to the portion E' over the waxed border area 49 as for example as by paraffin, that the sealed dispensing device may, if desired, be capable of withstanding an internal pressure of more than 10 lbs. per square inch. Again, if desired, the perforated line w may be sealed, prior to paraffining of the container, with a wax stronger than paraffin such as, for example, stearic acid or other wax having a high tensile strength at usual atmospheric temperatures.

The straight border edges 7 of the blank 2 together with the crimped lines 46', the crimp lines of the ears h, h', and the edges 52 of the tabs j and j' form the end edges of the container 1, continuing in the finished container as a straight edge continuation. These edges are illustrated in Fig. 2 as edges 52, crimped lines joining these edges with the edges 7 and the crimped lines through the parts g, g', f, f'. The edges 52 forming the top and bottom edges respectively of j, j' extend a distance no greater than the width of the panel e. The inner edges 46 of j, j' correspond to the edges 46 indicated at the ends of the panel e. This makes possible the formation of a multiple number of blanks from a minimum linear length of continuous printed fibrous paper board material. That is, the blank cut-off at right angles to the length of the continuous strip may be repeated again and again without any waste of cut-off material.

The length of the flat blank 2 through the middle portion of panels a, b, c, d, e corresponds to the length of each of the other blanks 3, 4, 5 so that great facility is obtained in the cut-off and fabrication of all blanks 2, 3, 4, 5; i. e. overlapped portions of these blanks may be cut off before overlapping without complete cut-off of any blank, the four strips being then glued and assembled to form an integral continuous strip and finally the final cut-off from this strip performed to obtain a flat integral blank of all material required in the finished container, without any additions except for material required for leak-proofing, sealing and stitching or stapling. Thus the container may be rapidly fabricated and assembled in part to a considerable degree in the form of a continuous strip material which is economical, by methods known in the art requiring very simple machinery. After final blank cut-off the integral blank as formed of glued together blanks 2, 3, 4, 5 may be assembled to form a flat tubular shaped blank by gluing the flaps e to the inner edge of panel a, and the flaps j, j' to the outer edge of panel a both at the top and bottom of the container. In this form of flat tubular shape a large number of container blanks may be stacked and shipped in a minimum shipping space to the bottling plant and then with a minimum number of simple mechanical assembling movements and without requiring the use of a container tube mandrel, the blank may be squared, bottled or filled, and assembled, in inexpensive machinery both rapidly and economically. Advantageously, the blanks 2, 3, 4, 5 are crimped before assembly into the form of an integral container blank so as to eliminate the need for score line redefining operations after squaring of the tubular shaped container blank.

The filling may be accomplished in any suitable manner, as for example by pouring the product (when a liquid product) into the containers, or by dipping the containers into a body of the food product. The filling may be effected by conveying the empty containers through the body of the liquid filling contents in accordance with the method of my application Serial No. 455,764, filed August 22, 1942. The filling may be effected through both ends, or one end as may be desired. The end enclosures are sealed by applying irons to remelt the stearic acid and/or paraffin, separately or simultaneously with the stapling, and then allowing the wax to cool.

The container is of such character as to be conveniently, rapidly and inexpensively assembled, upon a quantity basis of production, in inexpensive machinery requiring a minimum number of simple mechanical assembling movements and without the necessity for the use of a container tube mandrel during assembly and without requiring any score line redefinishing operations after squaring of the blank.

After assembly in the form of a flat tubular shaped blank of all strips of material required in the finished container, this blank, without further additions, except for material required for leak-proofing and stitching or stapling material required for sealing, integrally as a one-piece blank, may be readily squared by an external gripping device, then folded simultaneously at both ends, while immersed in a filling liquid, by externally applied forces to both end closures to provide a four-ply transverse rib closure, then the rib sealed between two jaws of a stapling device; then, after gripping the container between two plates at the closure ends, certain end flaps folded and stapled between one of each of these plates and a stapling device, and finally the two gripping plates withdrawn from the container to provide a liquid-tight sealed container having a flat box-like exterior throughout, whereby the finished container may be supported upon any dimension and stacked or packed with great facility.

The container is commercially non-refillable since it is, upon opening, non-resealable; the closure is tamper-proof; thus the container can not be reused for an inferior competitive product.

By providing a score line 46' between panels d and f wherein a deep rib portion of the score line will lie upon the external corner surface of the container, then upon bending and final assembling of the panel f, a non-drip corner will be obtained during pouring of the liquid contents.

I have described above certain of the advantages of the cushion closures at the top and bottom of the carton and in the particular embodiment shown these closures are incorporated in both the top and bottom. Such a closure on one or both ends of the container or carton tends to absorb shocks and to protect the container against injury or impairment. Also such a cushion closure automatically takes care of any increase of pressure which may occur in the container either during filling or thereafter, thereby minimizing the difficulties heretofore experienced in filling the containers. Preferably, however, the containers are filled in accordance with the methods set forth in my above mentioned application according to which method the creation of pressure is minimized.

Fig. 9 is a perspective view of the container showing the tearable element E torn away to expose the pouring opening E'. It is observed that in this particular structure of the container closure, a pouring trough is produced for facilitating the pouring operation, particularly as to the last small quantity remaining. Such trough is indicated by the folds along the lines 11 and 12 which converge and form the side walls of the trough for guiding the fluid to the opening E'.

It is also observed that the tearable element E is considerably larger than the pouring opening E' and accordingly when this element is removed as indicated in Figs. 1 and 9, a sanitary area surrounds entirely this opening thereby minimizing the chances of the fluid coming in contact with an unsanitary or previously exposed part of the container.

In the embodiment of Figs. 10 to 13, the structure of the container is simplified, a new and improved method of obtaining access to the pouring opening is provided and a sanitary pouring and drinking operation is assured. In this embodiment, the container blank or carton is formed of three blanks instead of the four of the first modification. The main body of the blank is formed as illustrated in Fig. 10 of panels $a$, $b$, $c$, $d$, $e$ and there are reinforcing strips corresponding generally to the two main reinforcing strips 2, 3 in the modification of Fig. 2. The reinforcing and closure strip for the bottom of the container is substantially the same in construction as the corresponding strip of Fig. 2. The main blank section having panels $a$, $b$, $c$, $d$, $e$ is substantially the same as the main blank section illustrated in Fig. 2 with the following differences. At the bottom there is disposed a reinforcing flap or shield 60' which is sealed or glued to the bottom reinforcing strip. This part 60' is crimped transversely of its length to form the end ears 61' and 62' for sealing to the reinforcing strip and folded thereabout during the forming operation. The bottom end of the main body section is provided with parts $f'$ and $g'$ which are similar to the similarly designated parts of Fig. 2 except that they are of different dimensions and the part $g'$ is shown in rectangular instead of trapezoid shape. In the finished container the parts $f'$ and 60' form the bottom outside surface walls of the container. The part $h'$ on the bottom edge of the main strip is also of rectangular shape instead of the shape illustrated in Fig. 2.

The top of the main strip section is provided with reinforcing strips and foldable parts 60, 61 and 62 which are similar to the parts 60', 61' and 62' at the bottom. Similarly the top of the strip is provided with the parts $f$, $g$ and $h$ corresponding to the parts $f'$, $g'$ and $h'$ at the bottom of the strip.

The pouring opening E' is formed in the panel $m$ of the reinforcing strip at the top, namely where the tearable part or window E is formed in Fig. 2. The removable part or window for gaining access to the pouring opening E' is formed at the top of the panel $b$ and partly on the reinforcing strip 60. This tearable and removable window is defined by the perforated line 63 and the two side perforated lines 64 and 65. The lifting of this window E exposes the pouring opening E' for pouring the food product out of the container. Any suitable means may be provided for the lifting of this window E but I have found a particularly saitsfactory and desirable way to be that illustrated in this container. For this purpose there is provided a tearable strip 66 formed crosswise of the panel $b$ and extends over into the panel $a$ to form a vertical section 66' terminating at the upper edge 7 of the panel $a$. The end of this vertical part 66' of the tearable strip is exposed and easy to engage between the fingers to tear along the perforated line 64 and the perforated line 67'. That is, the tearable strip is formed between the perforated lines 63 and 67 crosswise of the panel $b$ and between the vertical perforated line 64 and the vertical line 67' which joins the perforated line 67. By first tearing off this strip the bottom edge 63 of the removable window E is exposed and it is then a very simple matter to lift up this window by tearing along the perforated lines 64 and 65 until the pouring opening E' is entirely exposed. The perforated lines 64 and 65 in the particular embodiment shown are formed to be coincident with the crimped lines 14 formed in the reinforcing strip 60.

Fig. 11 shows the window E lifted up and exposing the pouring opening E' ready for emptying or drinking the liquid food product. In the container of this modification, the fluid product upon being poured out has no opportunity to come in contact with previously exposed or unsanitary parts of the wall of the container. Moreover, one may safely place his lips to the opening E' with the window E lifted, for the purpose of drinking without the lips coming in contact with a previously exposed and unsanitary part of the container.

I have indicated by stapling crosswise of the panels $a$, $b$, $c$, $d$ and $e$ where the reinforcing strips are sealed or glued to these panels. The top reinforcing strip is sealed to the panels $a$ and $b$ at points below the scoring lines 67 so that neither the tearing strip 66 nor the removable window E is glued to the reinforcing strip. This facilitates the tearng away of the strip 66 and the removal of the window E. Preferably the strip 66, 66' and the window E are weakly sealed to the inner layer as by paraffine or other suitable material which permits the ready tearing away of the strip and window. Such a weak seal is shown at 49.

The main body formed of panels $a$, $b$, $c$, $d$, $e$ is made of comparatively heavy material or of thick caliper. When the strips at the end are of comparatively thin material these strips may be more readily formed into tight end closures, while heavier parts 60, 60' form effective outside reinforcements for the thinner end strips.

In the packaging, distributing and marketing of products as, for example, milk, it is desirable to be able to manufacture single service containers upon a quantity production basis, and to this end I have devised a container 101 as shown in Fig. 19, which is formed of flat tubular blanks which may be stacked and shipped to the dairy or packaging plant. The blanks in this form of flat knock-down structure are ready for easy assembly, charging or filling, and immediate end closure, and this may be done by any suitable automatic machinery.

The rib seal or closure 47' in the modification of Figs. 10 to 13 may be further mechanically fastened as by the stapling indicated.

Referring again to the container illustrated in Figs. 1 to 9 and the modification illustrated in Figs. 10 to 13, the panels 25, 26, 27, 28 form inner reinforcing side-wall structures which extend vertically. The panel 26 and certain portions of panels 25, 27, i. e. portions adjoining panel 26 together with panel 26 extend vertically from the end 7 of the completely closed container 1. The triangular panels $k$, $l$ extending from panels 25, 27, respectively, extend between the two opposite side-wall panels 26, 28 and the extent of each panel $k$, $l$ is greater than the horizontal distance separating the panels 26, 28 from which the panels $k$, $l$ extend.

The folded blank 3 forming the end closure has a vertical extension 28 bonded to the inner surface of the vertical panel $d$, the latter extending upwardly a short distance above the bonded two-ply portion, the panel $d$ having an extension $f$ bent horizontally inwardly whereby to form a small enclosed clearance C' wherein to house the rib seal 47. The vertical panels 28, $d$ forming a two-ply end-wall for the liquid-holding compartment 48 support a comparatively thick end closure reinforcement portion formed by the panels $f$, $n$, and the four-ply rib, which thick portion is capable of functioning as a bumper to shield the two-ply end-wall of compartment 48. In the container illustrated in Figs. 1 to 9 the four-ply rib seal 47 is formed by the panels $o$, $p$, $q$, $r$, $s$, $t$, $w$. In the modification illustrated in Figs. 10 to 13 the rib seal 47' is formed by the panels 22, 24, $m$, 32, 29, 33, 34 of blank 3.

According to this embodiment of my invention, as illustrated in Figs. 14 to 19, the container 101 is formed of blanks 102, 103, 104, these blanks being formed of suitable fibrous material. The blank 102, as shown in Fig. 15, is of heavier and more rigid material than the blank 103, and forms the principal blank out of which the container is fashioned. It may, for example, be of cardboard having a suitable degree of elasticity so as to render the same capable of folding and fabricating operations. The blank is scored along the vertical lines 108 and the horizontal lines 109 to form panels $a$, $b$, $c$, $d$, and a strip $e$. The lower part of the blank is cut along the lines 115, 116, and 117 to form bottom closing flap portions 110, 111, 112 and 113, these cuts terminating at the lower horizontal scoring line 109. The vertical scoring lines 108 are extended upwardly to the end of the blank tube to form a top closure means in the form of parallelogram portions 118, 119 and 120. The portions 120 are scored along the lines 121, whereby these portions 120 are thereby formed into triangular parts $f$, $g$, and $h$.

The blank 103 if formed of a thinner and more flexible fibrous or paper material than that of which the blank 102 is made, and is fastened to the upper edge of the blank 102 in any suitable manner, as indicated in Fig. 15. For this purpose the strip 103 is superposed on the upper edge of the blank 102 as indicated and is glued or pasted or otherwise securely fastened thereto as, for example, by a suitable glue or paste 107 which is affixed to the upper edge of the blank 102. The blank 103, being of quite thin and flexible material, need not be provided with scorings corresponding to the scorings 108 and 121 of the blank 102, but, if desired, the same may be creased along the lines 108' to correspond to the scorings 108 when the tube blanks are superposed as indicated in Fig. 15. Similarly, creases 106 may be provided between the creases 106 and 108' with parallelogram portions 123 and trapezoid portions 122 when assembled as described below.

The unscored strip or blank 103 is preferably creased before being joined to the larger and more rigid blank shown in Fig. 15, and this may be done by any suitable means such, for example, as passing a continuous strip of pliable fibrous material such as paper the proper width between two rotating rolls under pressure, one roll comprising a surface of some elastic vulcanized rubber and the other roll comprising a metallic surface having somewhat sharpened raised portions so disposed thereon as to provide upon the passage of the strip therebetween the portions 122, 123 and 124. With the blanks 102 and 103 formed of the proper length as indicated above, they are fastened firmly together in any suitable manner as by means of a bonding such as rubber hydrochloride or glue 107. The blank is thus formed with a pliable upper extension formed of a strip 103 which may be readily manipulated and with great facility in the sealing operations to be hereinafter described.

With the blanks 102 and 103 thus fastened together to form a single blank, this composite blank is then bent along the scorings 108 into a somewhat tubular or rectangular form, with the panel section $e$ lying flat against or in abutting relation with the inner edge portion of the panel section $a$, and the lateral edges of the combined panel are firmly secured together as by a bonding similar to the bonding 107 described above. There is thus formed a square tube for the container. The bottom closing flaps 110, 111, 112 and 113 are then manipulated in any conventional manner to form a sealed closure for the bottom of the container. This may be effected in any suitable manner and with any conventional automatic machines. The cut 115 between the flaps 110 and 113 may be short of extending to the score line 109 to leave an uncut portion of, say, approximately twice the thickness of the container blank. Likewise the cuts 116 and 117 may terminate short of the bottom scoring 109.

With the blank thus formed into a tube-like blank the flaps 110 and 111 are folded inwardly and the flaps 112 and 113 are also then folded inwardly upon the flaps 110 and 111 and these flaps are sealed tightly together and to each other to form a water-tight seal and also to form a perfectly flat bottom which can support the container in an upright position.

Figs. 16 and 17 show two steps in the formation of the top closure of the carton. The parallelogram portions 120 being scored along the lines 121 are pushed inwardly towards each other, as indicated in Fig. 17 and these parallelogram portions become folded along the lines 121, while the portions 122 become folded along the lines 122'. The parallelogram portions 118 and 119 are then folded inwardly together with the attached portions 123, with the result that the triangular parts $f$ of 120 are flattened out underneath the triangular portions $g$ and $h$, and the portions 119 are flattened out to overlie the double folds $f$, $g$ and $h$. The parts 122 and 123 of the closure are thus formed into a rib $j$ with the parts 123 forming the outer layers and the parts 122 forming intervening double layers or loops therebetween.

This flexible and pliable rib $j$ is then folded over one side as indicated in Fig. 18.

By forming the upper edge of the blank of the more pliable and thinner fibrous material than the main body of the container so as to form a pliable and flexible but strong rib $j$ the latter may be folded over flat against either the portion 118 or 119 to form a substantially flat upper surface upon which the containers may be stacked with facility and, moreover, the formation of this rib of this kind of material facilitates the sealing of the container. The four-ply rib $j$, as shown in Fig. 18, may if desired be stitched in any suitable manner as by sewing with thread or other suitable means and then pressed down horizontally under heat and pressure. The square tubular blank after bottom closing is preferably treated with a coating substance inside and out such as, for example, paraffin, so as to strengthen the walls to render them leakproof during the final closure and fabricating operations and assist in rendering the closure panels heat-shapable and paraffin-bindable. As indicated, this operation preferably takes place before the sealing operations at the top above described.

The container thus constructed has the advantages indicated above. A still further improvement resides in the formation and incorporation of a cap blank 125, this cap blank having dimensions commensurate with the upper end of the container and having triangular skirts 126 and 127 extending down from the two opposite edges thereof. This cap blank is advantageously made of a quite rigid fibrous material such as, for example, cardboard having some degree of elasticity, so as to render the same capable of the folding and fabricating operations. This cap blank 125 is incorporated on the top of the container by inserting the triangular portions 126 and 127 underneath the folds g and h so as to rest upon the triangular portions f. The parts 126 and 127 are thus of substantially the dimensions of the triangular portions f but are slightly smaller in dimensions to avoid binding when these triangular parts 126 and 127 are inserted in position. After the insertion of these triangular parts 126 and 127 underneath the folds g and h and upon the folds f and with the square portion 125 resting upon the top portion 118 and 119, the cap is sealed and fastened to the top in any suitable manner. This cap thus forms a reinforcement for the top closure, contributes towards a more effective seal, and also forms a substantially flat upper surface, as illustrated in Fig. 19, upon which other containers may be stacked with facility.

For facilitating the shipment of the reinforcing cap blanks 125, these blanks may as set forth in the pending application 340,923, be scored along the lines joining the triangular parts 126 and 127 with the base part 125, and these triangular parts 126 and 127 may be bent downwardly and a multiplicity of them nested together for shipment.

Any suitable method and apparatus may be used for affixing the reinforcing caps 125 to the containers to form a part of the top closures thereof, such for example as the method and apparatus shown in the above mentioned application.

Hard paraffine having a melting point of not less than 56° C. is preferably used for saturation of the reinforcing cap blank 125, since it makes a stronger adhesive than lower melting point grades.

The container of my invention can be filled with solid as well as liquid materials, and the container thereafter easily closed and hermetically sealed, or, upon opening of the container without destroying the cap blank 125 easily reclosed by re-using the cap blank. This is in contradistinction to hermetically sealed containers heretofore made and with which I am familiar. Furthermore, this type of sealed container is easily opened when so desired, or to facilitate opening, paraffin instead of glue may be used to join panel 113 to panel 112 in abutting relation.

It is understood that with the blank shown in Fig. 15, and formed into a rectangular shaped tube-like structure the bottom of the container is sealed in any suitable manner as indicated above to form a flat bottom. After that is done and with the upper end of the container entirely open, the contents are introduced in any suitable manner and with any desired automatic machinery, the whole of the container having been previously coated inside and out with paraffin. After the filling the top is closed and sealed in accordance with any of the above-disclosed methods. The central rib j may be compressed by heat and pressure between two irons or other suitable means and the central rib then pressed down flat horizontally by any suitable means such as, for example, by applying suitable pressure in rolling down under heat to soften the paraffin. Prior to this pressing operation the rib may be secured against displacement, if desired, by stitching or sewing with thread or by crimping the central rib plies together under a temperature sufficient to soften the paraffin. As described above, the interfolding closure portions of the rib j and the co-operating container parts are shielded and anchored against shock, warping and displacement by the reinforcing cap blank 125 which is applied in any suitable manner as described above.

In Fig. 20 I have shown diagrammatically, first, a method of saturating with liquid paraffin a bottom-end closed container with the top-end unclosed, and, second, a method of saturating a scored cap blank also with liquid paraffin.

The container shown in Fig. 19 may be opened in any suitable manner as, for example, the user may utilize any instrument to pull the sealed flaps 10, 11, 12 and 13 apart and this would be facilitated if paraffin is used in the sealing operation. The top, which comprises the reinforcing cap 125 may be similarly opened by any suitable instrument which is inserted between the ply layers to pull them apart. If desired the container may be provided with an opening which is sealed by a pull off tab in any conventional manner as, for example, indicated in Fig. 19 at 165.

Where a resin such as rubber hydrochloride is used instead of glue for bonding, this may be applied to any two surfaces to be joined together in the form of a solution and then solidified by evaporation of the solvent. Then, at any time thereafter, the two coated surfaces may be instantaneously joined together by heat and pressure at a temperature sufficient to soften the resin. Furthermore, this form of bonding is adaptable to high speed container-making machines.

The side walls and outer closure means being made of fibrous material are easily printed or decorated and this is preferably done before any cutting or fabrication, i. e. upon the continuous sheet material.

This application is a continuation in part of all subject matter common to that of my application Serial No. 340,923, filed June 17, 1940.

I claim:

1. A carton of the character set forth having an extension forming a closure therefor and folded over upon itself to form a flat-top, stackable, shock-absorbing closure, one of the sides of said extension being folded inwardly along a line disposed adjacent the end surface of a side wall of the carton and spaced inwardly from the end of the carton and also folded along a line parallel to the first line but intermediate its length to form a double fold with the opposite side of the extension folded over upon the double fold of the first-named side to form an end flat surface.

2. An open ended carton of the character set forth having an extension within and secured to said open end inwardly of said open end and forming a closure therefor, said extension being folded over upon itself to form a flat-top, stackable, shock-absorbing closure, one of the sides of said extension being foldable along a line spaced inwardly from the end of the carton and also folded along a line parallel to the first line but intermediate the length of the said side to form a double fold with the opposite side of the extension folded over upon the double fold of the first-named side to form the flat top, the other pair of opposite sides being folded inwardly along lines inclined to the length of the carton and each line having an end spaced inwardly from the end of the carton and each of said last-named pair of sides being inwardly folded along a pair of converging lines extending outwardly from said inclined lines and along another line extending lengthwise of the side and disposed intermediate the edges thereof.

3. A carton of the character set forth having an extension forming a closure therefor and folded over upon itself from one side to form a flat-top, stackable, shock-absorbing closure, the opposite side of said extension being folded inwardly along a line spaced inwardly from the end of the carton and also folded outwardly along a line parallel to the first line but intermediate its length to form a double fold with the opposite side of the extension folded over upon the double fold of the first-named side to form the flat top and also being formed of a two-ply construction with an opening formed in the inner ply and a liftable window in the outer ply registering with the opening.

4. A container of the character set forth having an extension forming a closure therefor and folded over upon itself from one side to form a flat-top, stackable, shock-absorbing closure, the opposite side of said extension being folded inwardly along a line spaced inwardly from the end of the carton and also folded outwardly along a line parallel to the first line but intermediate its length to form a double fold with the opposite side of the extension folded over upon the double fold of the first-named side to form the flat top, said extension being fastened to the container walls along areas disposed inwardly from the end to form a reinforced end container.

5. In a container of the character set forth, a main body part formed of four rectangular sides or panels of equal length, a separate flat-top closure having panels corresponding to the panels of the body secured to one end of the body adjacent the end edge thereof and forming an extension of the body, the panels of the closure being folded inwardly along fold lines, one opposed pair of panels of the cover being folded inwardly along lines extending at an angle to the end edge of the body and extending from the end edge to a point spaced inwardly thereof, the other opposed pair of panels of the cover being folded inwardly along lines relatively disposed lengthwise of the container, connecting the corresponding ends of the last named lines, two of said cover panels having a multi fold each, and one of said cover panels forming the outer wall and embracing said multi folds, and one of the sides of said main body part having a folded over part engaging said outer wall, and holding the same in place.

6. In a carton of the character set forth in claim 2 wherein the folded over part of the extension is formed of a double ply with a pouring opening formed in the inner ply and a tearable section registering with said pouring opening formed in the outer ply.

7. In a carton of the character set forth in claim 2 wherein a pouring opening is formed in the folded over extension, and an outer side wall adjacent thereto is folded over said pouring opening to close the same, with a part of said pouring opening closure being formed into a removable window registering with said pouring opening and a tearable strip formed in said side wall adjacent the folded over part thereof facilitating access to said removable window.

8. In a carton of the character set forth in claim 2 wherein folds of said extension form a trough with converging sides and an openable pouring outlet is formed in the extension between the converging folds.

9. A container of the character set forth comprising four rectangular outer side panels, a closure extension for the container secured therewithin and having panels corresponding to the outerside panels, the panels of the closure extension being folded inwardly along fold lines disposed in the vicinity of the end edge of the container, the opposed panels of one pair being folded inwardly along lines extending at an angle to the end edge of the container and extending from the end edge to a point spaced inwardly thereof, the other opposed pair of panels of the closure being folded inwardly along lines relatively disposed lengthwise of the container and connecting the corresponding ends of the last named lines, one of the panels of said last-named opposed pair of panels being also folded intermediate its length with the outer end thereof extending in an outward direction from the container and the outer end wall of the container being formed at least in part by one of said panels, and means fastening said closure extension in position.

10. An open ended carton of the character set forth having an extension within said open end and secured to said carton inwardly of said open end and forming a closure therefor mergable into a collapsible multi-ply rib closure, said extension being folded over upon itself to form the closure structure of a flat-top, stackable, shock-absorbing closure, one of the sides of said extension being foldable along a line spaced inwardly from the end of the carton and also folded along a line parallel to the first line but intermediate the length of the said side to form a double fold with the opposite side of the extension folded over upon the double fold of the first-named side to form the closure structure of the flat top, the other pair of opposite sides being folded inwardly along lines inclined to the length of the carton and each line having an end spaced inwardly from the end of the carton and each of said last-named pair of sides being inwardly folded along a pair of converging lines extending outwardly from said inclined lines and along another line extending lengthwise of the side and disposed intermediate thereof, including means located outwardly from the inwardly spaced ends of said lines inclined to the length of the carton to circumscribe said collapsible rib closure when the rib is collapsed.

11. An open ended carton of the character set forth having an extension within and secured to said open end inwardly of said open end and forming a closure therefor mergable into a collapsible multi-ply rib closure, said extension being folded over upon itself to form the closure structure of a flat-top, stackable, shock-absorbing closure, one of the sides of said extension being foldable along a line spaced inwardly from the end of the carton and also folded along a line parallel to the first line but intermediate the length of the said side to form a double fold with the opposite side of the extension folded over upon the double fold of the first-named side to form the closure structure of the flat-top, the other pair of opposite sides being folded inwardly along lines inclined to the length of the carton and each line having an end spaced inwardly from the end of the carton and each of said last-named pair of sides being inwardly folded along a pair of converging lines extending outwardly from said inclined lines and along another line extending lengthwise of the side and disposed intermediate thereof, including means to embrace a collapsible portion of said rib closure.

SYLVESTER CLYDE LEHMAN.

REFERENCES CITED

The following references are of record in the file of this patent:

UNITED STATES PATENTS

| Number | Name | Date |
|---|---|---|
| 2,300,703 | Ray | June 3, 1942 |
| 2,312,895 | Gordon | Mar. 2, 1943 |
| 508,571 | Hoffman | Nov. 14, 1893 |
| 1,494,518 | Whippey | May 20, 1924 |
| 1,277,833 | Beckwith | Sept. 3, 1918 |
| 2,326,527 | Emmerich | Aug. 10, 1943 |
| 355,862 | Clark | Jan. 11, 1887 |
| 2,132,925 | Bensel | Oct. 11, 1938 |
| 2,305,371 | Yates | Dec. 15, 1942 |